United States Patent
Ma

(10) Patent No.: US 8,795,555 B2
(45) Date of Patent: Aug. 5, 2014

(54) METHOD OF MANUFACTURING NICKEL ELECTRODE FOR NICKEL-ZINC BATTERY

(71) Applicant: Fuyuan Ma, Zhejiang (CN)

(72) Inventor: Fuyuan Ma, Zhejiang (CN)

(73) Assignee: Hangzhou Neucell Energy Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 13/674,062

(22) Filed: Nov. 11, 2012

(65) Prior Publication Data

US 2013/0062580 A1 Mar. 14, 2013

Related U.S. Application Data

(62) Division of application No. 12/930,221, filed on Dec. 31, 2010, now Pat. No. 8,343,389.

(51) Int. Cl.
*H01B 1/02* (2006.01)

(52) U.S. Cl.
USPC ..................................... 252/521.2; 252/182.1

(58) Field of Classification Search
USPC .................................. 252/513, 521.2, 182.1
See application file for complete search history.

(56) References Cited

U.S. PATENT DOCUMENTS

| 2004/0170555 A1* | 9/2004 | van Heuveln et al. | ........ 423/463 |
| 2011/0070501 A1* | 3/2011 | Chang et al. | .................. 429/232 |

FOREIGN PATENT DOCUMENTS

EP 1176649 A1 * 1/2002

\* cited by examiner

*Primary Examiner* — Mark Kopec
*Assistant Examiner* — William Young
(74) *Attorney, Agent, or Firm* — Raymond Y. Chan; David and Raymond Patent Firm

(57) ABSTRACT

A method of manufacturing nickel electrode for a nickel-zinc battery includes the steps of: providing a nickel oxyhydroxide (NiOOH) and a nickel metal; adding a first additive consisting of transition metal oxide to the nickel oxyhydroxide and the nickel metal; and adding a binder for combining the first additive to the nickel oxyhydroxide and the nickel metal, wherein the first additive contains one or more transition metal oxides selected from a group consisting of ruthenium oxide ($RuO_2$) and rhodium oxide ($RhO_2$). Metal oxide or hydroxide with a rare earth oxide improves the electrode capacity and shelf life. Zinc oxide is added to the cathode to facilitate charger transfer and improve the characteristics of high rate discharging. The cathode significantly increases the charging efficiency, promotes the overpotential of oxygen evolution, and intensifies the depth of discharging, thereby increasing the overall efficiency and lifespan of the battery.

5 Claims, 1 Drawing Sheet

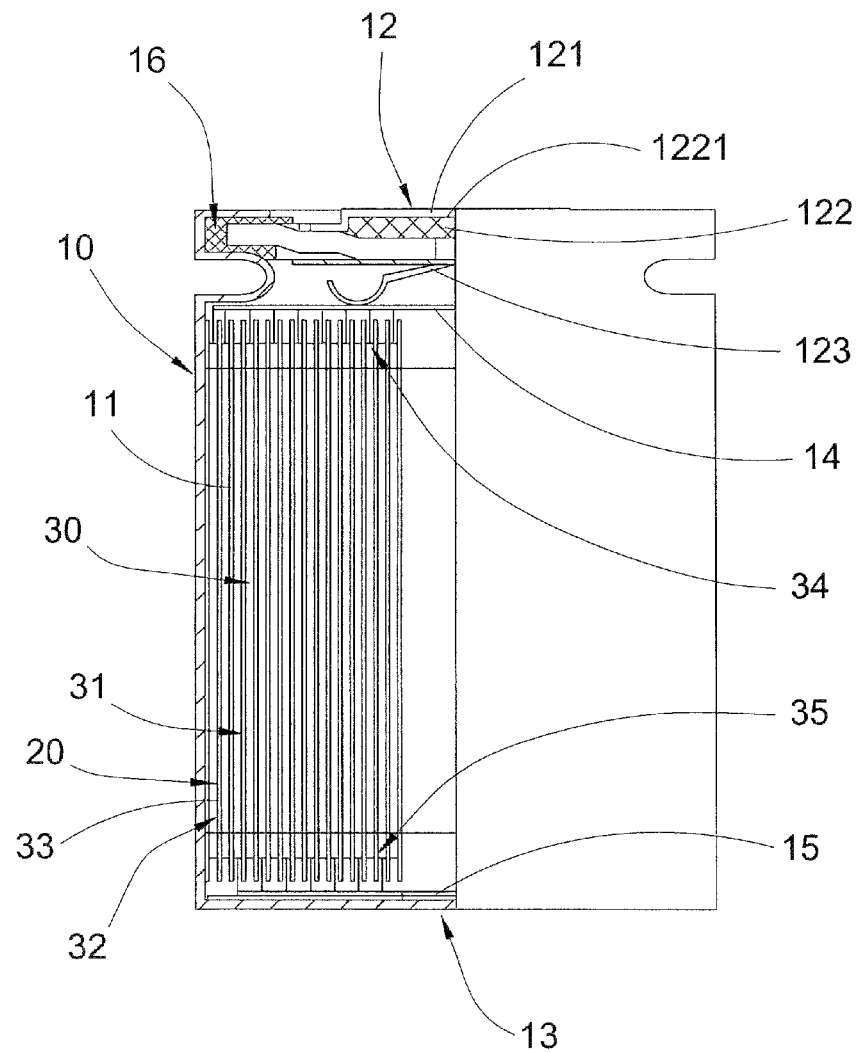

METHOD OF MANUFACTURING NICKEL ELECTRODE FOR NICKEL-ZINC BATTERY

CROSS REFERENCE OF RELATED APPLICATION

This is a Divisional application that claims the benefit of priority under 35 U.S.C. §119 to a non-provisional application, application Ser. No. 12/930,221, filed Dec. 31, 2010.

BACKGROUND OF THE PRESENT INVENTION

1. Field of Invention

The present invention relates to a nickel-zinc battery, and more particularly to an additive for nickel-zinc battery to increase the efficiency and lifespan of the battery.

2. Description of Related Arts

At present, the growing environmental situation forced many countries to issue strict environmental regulations, green and low-carbon economy has become a trend. As the oil price remains high, the prosperity of interne and electronic products have given rise to new growing markets of rechargeable batteries. Particularly, the fast growth of hybrid electric vehicle (HEV), plug-in hybrid electric vehicle (PHEV), and electric vehicle (EV) market have led to urgent need of a kind of battery that is of higher energy, higher power, more stable, safer, and more environmental friendly. Conventional battery technologies, such as lead acid and nickel-cadmium batteries, cannot meet the market needs. In addition, these batteries are not in line with the requirements of environmental protection. Lithium batteries, though very successful in the portable electronic applications, cannot meet the requirements of large systems due to inadequate power, high price, and risk of safety.

The emerging nickel-zinc (Ni—Zn) battery technology has the potential to fulfill various application needs. The nickel-zinc is a rechargeable battery with high power and adequate energy while pollution level, risk level and cost are low since heavy metals such as Pb, Cd, and Hg are not used in the manufacture and the battery is non-flammable.

Despite their advantages, Ni—Zn batteries have unresolved problem of short cycle life for many years. The reason of its short cycle life is believed to be caused by: (1) zinc dendrites growth during charging process which causes short circuit in the battery and limits its service life; (2) zinc which is soluble in alkaline electrolyte and does not keep in the same place during charging and discharging processes for causing shape change; and (3) electrode material falling during cycling leading to loss in cell capacity.

Most of the researches on the Ni—Zn batteries are focused on the prevention of dendrites and/or distortion of Zn anodes, but fewer researches are aimed at the cathodes. The importance of the cathode composition is much neglected. As a common method, the Ni cathode of a Ni-MH or Ni—Cd battery is completely employed in the Ni—Zn batteries, leading to poor performance.

The charging efficiency of nickel cathode electrode is low in a nickel-zinc battery, especially at the late charging stage. Several problems can be caused by the cathode when it is at the low charging efficiency stage. First, the zinc anode could be overcharged and dendrites are easily built. Second, unwanted and extra oxygen evolution may occur at the cathode during charging. Third, the cathode may expand and get loosely packed when overcharged. Fourth, the zinc anode has to be over-weighted to counter balance the low charging efficiency of the cathode.

In the conventional arts, cobalt and cobalt oxides or hydroxides have been applied in the cathode for increasing the charging efficiency, promoting the overpotential of oxygen evolution, and intensifying the depth of discharging. In theory, the metal cobalt cannot be dissolved in alkali. However, the cobalt in the surface is unavoidably oxidized. Then, the cobalt oxides and its hydroxides can both be dissolved in the alkali liquid, imposing safety concern to the battery.

When cobalt compounds dissolved within the alkali electrolyte, it will contact with the Zn electrode. Then the cobalt compounds will promote hydrogen evolution at the Zn electrode, resulting in great risk concerning safety and making the battery fail to meet the requirements of application. Therefore, it is apparent that the cobalt additive is not a solution for a Ni—Zn battery to increase the charging efficiency, promote the overpotential of oxygen evolution, intensify the depth of discharging, while maintaining the high power capability and environmental friendliness of the nickel-zinc battery.

SUMMARY OF THE PRESENT INVENTION

The invention is advantageous in that its put the much neglected development area of a Ni—Zn battery into the center place of development. Instead of handling the dendrite and deformation problems of the Ni—Zn battery, the present invention puts the focus on the electrode. In fact, the performance of a cathode is the key to the entire battery, which should be the most influential factor for the overall efficiency of a battery.

Another advantage of the invention is to provide an additive for nickel cathode that can increase the charging efficiency, promote the overpotential of oxygen evolution, and intensify the depth of discharging, while still maintaining the high power capability and environmental friendliness of the nickel-zinc battery.

Another advantage of the invention is to provide an additive for nickel-zinc battery to increase the efficiency and lifespan of the battery.

Another advantage of the invention is to provide a kind of cathode additive for nickel-zinc battery to increase the efficiency and lifespan of the battery.

Another advantage of the invention is to provide a nickel cathode for nickel-zinc battery which is long life, capable of long-term storage and having excellent performance of high rate discharging, thereby capable of increasing the overall efficiency and lifespan of the nickel-zinc battery.

Another advantage of the invention is to provide a nickel cathode for nickel-zinc battery which is capable of having an increased charging efficiency, promoting over-potential of oxygen evolution at the cathode, intensify a depth of discharging property and increasing capacity of the cathode, such that the cycle life, shelf life and storage life of the cell employing the nickel cathode of the present invention are improved.

Another advantage of the invention is to provide an improved nickel cathode for nickel-zinc battery which is long life, capable of long-term storage and having excellent performance of high rate discharging, while providing a simple structure, low cost manufacture and improved safety, thereby capable of increasing the overall efficiency and lifespan of the nickel-zinc battery.

Additional advantages and features of the invention will become apparent from the description which follows, and may be realized by means of the instrumentalities and combinations particular point out in the appended claims.

According to the present invention, the foregoing and other objects and advantages are attained by a composition for electrode of a nickel-zinc battery, consisting of:

a nickel oxyhydroxide having a concentration from approximately 50% to 98% by weight;

a nickel metal powder having a concentration from approximately 1% to 20% by weight;

a first additive of a transition metal oxide having a concentration from approximately 0.05% to 5% by weight, wherein the first additive is ruthenium oxide ($RuO_2$), rhodium oxide ($RhO_2$) and/or their combination;

a second additive of oxide mixture having a concentration from approximately 0.05% to 5% by weight; and a binder having a concentration from approximately 0.05% to 5% by weight of solid content.

In accordance with another aspect of the invention, the present invention comprises a method of manufacture of nickel electrode for a nickel-zinc battery, comprising the steps of:

(a) providing a nickel oxyhydroxide (NiOOH) and a nickel metal;

(b.1) adding a first additive consisting of transition metal oxide containing ruthenium oxide ($RuO_2$) and/or rhodium oxide ($RhO_2$) to the nickel oxyhydroxide and the nickel metal;

(b.2) adding a second additive consisting of metal oxide or hydroxide with one or more rare earth oxide to the nickel oxyhydroxide and the nickel metal to increase an electrode capacity and a shelf life of the nickel electrode; and (c) adding a binder for combining the first and second additive to the nickel oxyhydroxide and the nickel metal, wherein the nickel oxyhydroxide has a concentration from approximately 50% to 98% by weight, the nickel metal powder has a concentration from approximately 1% to 20% by weight, the first additive has a concentration from approximately 0.05% to 5% by weight, the second additive has a concentration from approximately 0.05% to 5% by weight and the binder has a concentration from approximately 0.05% to 5% by weight of solid content.

Optionally, zinc oxide (ZnO) or hydroxide ($Zn(OH)_2$), having a concentration from approximately 0.1% to 5% by weight can be added to facilitate charger transfer and increase high-rate discharging ability.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 1 is an illustration of a Nickel-Zinc battery according to a preferred embodiment of the present invention.

DETAILED DESCRIPTION OF THE PREFERRED EMBODIMENT

According to the preferred embodiment of the present invention, a cell construct for a nickel-zinc battery includes an additive to increase the efficiency and lifespan of the battery is provided. Preferably, the additive for nickel-zinc battery is a kind of cathode additive for providing features of long life, long-term storage and excellent performance of high rate discharging, to the cathode, thereby increasing the overall efficiency and lifespan of the nickel-zinc battery.

The nickel-zinc battery of the present invention is a rechargeable battery with high power and adequate energy, which is four times as that of lead acid batteries. At the to same time, the nickel-zinc battery of the present invention does not make use of lead (Pb), Cadmium (Cd) and mercury (Hg) and hence has low environmental pollution while having high power and adequate energy, has a high safety level (non-inflammable) in view of low hydrogen evolution, and maintaining a low cost for manufacture.

For example, the cathode additive according to the preferred embodiment is embodied in a nickel cathode for nickel-zinc battery for providing features of long life, long-term storage and excellent performance of high rate discharging to the cathode, which is simple in structure, low cost of manufacture and with improved safety, thereby capable of increasing the overall efficiency and lifespan of the nickel-zinc battery.

In particular, the cell construct according to the preferred embodiment of the present invention comprises a nickel electrode 20 which acts as a cathode, a zinc electrode 30 which acts as an anode, an electrolyte 40 and a membrane 50 disposed between the nickel and the zinc electrodes 20, 30. Preferably, the nickel electrode 20 is manufactured by combining a powdered mixture of a plurality of desired materials. In particular, the nickel electrode 20 is manufactured by combining nickel oxyhydroxide (NiOOH), nickel metal, transition metal oxide such as ruthenium oxide $RuO_2$, and/or metal oxide or hydroxide such as calcium hydroxide $Ca(OH)_2$ with a rare earth oxide such as yttrium oxide $Y_2O_3$, and a binder that is rolled onto a suitable current collector such as nickel foam.

In other words, the present invention provides a method of manufacture of nickel electrode 20 for a nickel-zinc battery, comprising the steps of:

(a) providing a nickel oxyhydroxide (NiOOH) and a nickel metal;

(b.1) adding a first additive consisting of transition metal oxide to the oxyhydroxide and the nickel metal; and (c) adding a binder for combining the first additive to the nickel oxyhydroxide and the nickel metal.

Preferably, the transition metal oxide of the first additive is ruthenium oxide ($RuO_2$) and the binder is carboxymethyl cellulose (CMC) and/or polytetrafluoroethylene (PTFE). Preferably, after step (b.1), the method further comprises the step of:

(b.2) adding a second additive consisting of metal oxide or hydroxide with a rare earth oxide to the oxyhydroxide and the nickel metal such that an electrode capacity and a shelf life of the electrode is increased. For example, the second additive is calcium hydroxide $Ca(OH)_2$ with yttrium oxide $Y_2O_3$.

It is worth mentioning that zinc oxide ZnO or hydroxide $Zn(OH)_2$ can also be added to facilitate charger transfer and improve the high-rate discharging characteristic of the nickel-zinc cell. The concentration of the zinc oxide or hydroxide is approximately 0.1% to 5%.

In other words, the metal oxide or hydroxide in step (b.2) of the method of manufacture is zinc oxide or hydroxide in a concentration of approximately 0.1% to 5%.

The nickel electrode 20 according to a first exemplary embodiment, which is adapted for acting as the cathode in the nickel-zinc battery, consists of nickel oxyhydroxide in a concentration from approximately 50% to 98%, nickel metal powder in a concentration of approximately 1% to 20%, a first additive of transition metal oxide such as ruthenium oxide $RuO_2$ and rhodium oxide ($RhO_2$) in a concentration of approximately 0.05% to 5%, and a binder such as carboxymethyl cellulose CMC and polytetrafluoroethylene PTFE in a concentration of approximately 0.05% to 5% by its solid content. The nickel electrode 20 may further consist of a second additive which is a mixture of metal oxide or hydroxide and a rare earth oxide. In particular, the second additive contains one or more metal oxide or hydroxide which is selected from the group consisting of MgO, Mg(OH)2, ZrO2, Zr(OH)4, CaO, Ca(OH)2, SrO and Sr(OH)2 and one or more rare earth oxide which is selected from the group consisting of Y2O3, Yb2O3 and Lu2O3. The percentage of the metal oxide or hydroxide is ranged from 0.05% to 5% and that of the rare metal oxide is ranged from 0.05% to 5%. The ratio of metal oxide or hydroxide to the rare metal oxide is 1:3. The nickel electrode 20 may further consist of a third additive which is zinc oxide or hydroxide ZnO or Zn(OH)2 in a concentration of approximately 0.1% to 5%.

In particular, according to a first exemplary embodiment of the nickel electrode 20 according to the preferred embodiment of the present invention, which is adapted for acting as the cathode in the nickel-zinc battery, the nickel electrode 20 consists of 90% nickel oxyhydroxide, 5% nickel metal powder, a first additive of transition metal oxide which is 0.5% ruthenium oxide RuO2, and a binder consisting of 0.22% carboxymethyl cellulose CMC (solid content) and 0.6% polytetrafluoroethylene PTFE (solid content). Compared to conventional cell with 94% nickel oxyhydroxide, 4% cobalt oxide (CoO), 0.6% CMC (solid content) and 1.4% PTFE (solid content), the first exemplary embodiment of nickel electrode 20 has a greatly increased life cycle and storage life.

In particular, according to a second exemplary embodiment of the nickel electrode 20 according to the preferred embodiment of the present invention, the nickel electrode 20 consists of 90% nickel oxyhydroxide, 4.3% nickel metal powder, a first additive of transition metal oxide which is 0.4% ruthenium oxide RuO2, a second additive consisting of 0.2% calcium hydroxide Ca(OH)2 and 0.6% yttrium oxide Y2O3, and a binder consisting of 0.24% carboxymethyl cellulose CMC (solid content) and 0.58% polytetrafluoroethylene PTFE (solid content). Compared to conventional cell with 94% nickel oxyhydroxide, 4% cobalt oxide (CoO), 0.6% CMC (solid content) and 1.4% PTFE (solid content), the second exemplary embodiment of nickel electrode 20 has a greatly prolonged life cycle and shelf life.

In particular, according to a third exemplary embodiment of the nickel electrode 20 according to the preferred embodiment of the present invention, the nickel electrode 20 consists of 90% nickel oxyhydroxide, 5% nickel metal powder, a first additive of transition metal oxide which is 0.5% ruthenium oxide RuO2, a second additive consisting of 0.4% zinc oxide ZnO and 0.4% yttrium oxide Y2O3, and a binder consisting of 0.22% carboxymethyl cellulose CMC (solid content) and 0.6% polytetrafluoroethylene PTFE (solid content). Compared to conventional cell with 94% nickel oxyhydroxide, 4% cobalt oxide (CoO), 0.6% CMC (solid content) and 1.4% PTFE (solid content), the third exemplary embodiment of nickel electrode 20 has a greatly prolonged life cycle and increased high-rate discharging property.

It is worth mentioning that nickel metal powder or other conductive agents are added to improve the conductivity of the cathode and are not reactants for carrying out reaction at the cathode. The nickel metal powder or other conductive agents are preferably super small and even particles which have a high porosity, low apparent density and high specific area, adapted for generating a good conductive network in the cell, thereby greatly increasing the charging and discharging rate of reactants (which are active substances for reaction at the cathode) and further promoting the charging and discharging electrons for large current flow. Accordingly, the internal resistance is reduced and the battery life is increased.

Conventional cell makes use of cobalt compounds such as cobalt, cobalt oxides and hydroxides as an additive in the cathode which is dissolved in alkaline electrolyte solution to increase conductivity and capacity. However, the dissolved cobalt compounds in the electrolyte react with the zinc anode and promote hydrogen evolution at the anode which make it undesirable to use for nickel-zinc battery. The present invention is a breakthrough to solve the problem of low electrical conductivity and low capacity in the absence of cobalt compounds at the nickel cathode, through the addition of ruthenium oxide (RuO2) and/or rhodium oxide (RhO2) compounds as additives to improve the electrical properties of the nickel cathode.

Ruthenium oxide (RuO2) has great capacity to store charge when used in aqueous solutions. In particular, RuO2 by itself is a poor catalyst because its surface area is greatly decreased without the presence of a hydrate. By foiming their hydrates, ruthenium oxide has great properties to improve the conductivity and capacity for the nickel cathode.

Rhodium oxide (RhO2) also has the characteristics of improving the carrier injection from rhodium-oxide-coated indium tin oxide. When RhO2 is added into the cathode paste, it also improves the electrical properties of the cathode electrode through enhancement of carrier injection into the metal oxides.

In addition, the second additive contains one or more metal oxide or hydroxide which is selected from the group consisting of MgO, Mg(OH)2, ZrO2, Zr(OH)4, CaO, Ca(OH)2, SrO and Sr(OH)2 and one or more rare earth oxide which is selected from the group consisting of Y2O3, Yb2O3 and Lu2O3. The percentage of the metal oxide or hydroxide is ranged from 0.05% to 5% and that of the rare metal oxide is ranged from 0.05% to 5%. The ratio of metal oxide or hydroxide to the rare metal oxide is 1:3.

It is worth mentioning that a series of experiments have proved that the additives can greatly increase the capacity of the active materials of the cathode. The additive also promotes the oxygen evolution, overpotential and charging efficiency of the cathode. More importantly, the additives of the present invention can effectively increase the cycling life of the cell and slow down the decrease of capacity.

In order to demonstrate the effectiveness of the cathode composition, a preferred and selected testing embodiment comprising 90% nickel oxyhydroxide, 4.3% nickel metal powder, 0.4% ruthenium oxide, 0.6% Y2O3, 0.2% Ca(OH)2, 0.24% CMC, and 0.58% PTFE is used for testing. The results show that the cell has a much longer cycle life and much less the decrease of the capacity over conventional nickel-zinc cell in which 94% nickel oxyhydroxide, 4% cobalt oxide (CoO), 0.6% CMC, and 1.4% PTFE are used. The cycle life of the Ni—Zn battery of the present invention is significant longer than the conventional nickel-zinc cell. In other words, the present invention has greatly improved the cycle life of the Ni—Zn battery.

Another discovery of our research is that, in order to reach the best effects the two substances: the metal oxide or hydroxide (at least one of MgO, Mg(OH)2, ZrO2, Zr(OH)4, CaO, Ca(OH)2 SrO, Sr(OH)2, and the rare earth oxide (at least one of Y2O3, Yb2O3, and Lu2O3) must be present together in the cathode mixture.

Conventional Ni electrode is likely to have only a moderate charging efficiency and cause the oxygen evolution, especially at the late charging stage. Adding calcium compounds can increase the overpotential to curb the evolution of oxygen. However, the calcium compounds do not enhance the conductivity of the cathode. Adding cobalt can increase the conductivity of active substances and the cobalt is also good for the reaction transformation in the cathode. Therefore, adding cobalt and calcium can obviously increase the use ratio and charging/discharging overpotential of the active substances. Nevertheless, the cobalt compounds in alkali liquid are likely to be dissolved in the electrolyte, thus making the Zn anode evolve hydrogen easily and resulting in high internal pressure and high risk of leakage. The addition of cobalt fails to provide a solution to a Ni—Zn battery.

Adding rare earth compounds can increase the overpotential to curb the oxygen evolution, especially improving the high temperature performance of active substances. The rare earth compounds Y2O3, Yb2O3, and Lu2O3 are selected as additives and their influences on the high temperature performance of Ni electrode are researched. A comparison is made on the performance of a battery with Y2O3 and another one without the rare earth additive. The results show that the rare earth additives can curb the evolution of oxygen in the charging process of the Ni electrode and promote the charging efficiency at high temperature. At the same time, it shows that the battery with Y2O3 additive is relatively easy to be activated so that it can shorten the activation process and reduce the manufacturing cost of the battery. Moreover, battery with Lu2O3 additive has the highest capacity under high temperature while battery with Y2O3 additive has the highest charging efficiency of the cathode.

Battery added with calcium (Ca) compounds, such as CaF2 and Ca(OH)2, in cathode has resulted in high capacity. This is due to the oxygen evolution overpotential in the late period of charging for the cathode has been obviously enhanced, resulting in the large increase of charging efficiency of the Ni electrode, so that increase the usage of the active material of NiOOH. When Ca compounds, Y2O3 and/or Lu2O3 are added together, they can greatly increase the charging efficiency, curb the oxygen evolution, promote use rate of NiOOH substance, and reduce the inflation and electrode material shedding, enhancing the stability of a Ni—Zn battery.

Optionally, the cathode composition of the present invention further includes a zinc oxide (ZnO or Zn(OH)2) as an additive to facilitate charger transfer and improve the high-rate discharging characteristics of the nickel-zinc cell. A select testing embodiment with ZnO additive comprising 90% nickel oxyhydroxide, 5% nickel metal powder, 0.5% ruthenium oxide, 0.4% Y2O3, 0.4% ZnO, 0.22% CMC, and 0.6% PTFE is used for testing. The results show that the nickel-zinc cell has a much longer cycle life and high rate discharging over conventional cell with 94% nickel oxyhydroxide, 4% cobalt oxide (CoO), 0.6% CMC, and 1.4% PTFE. The performance of a sub-C size battery with a rated capacity of 2200 mAh is shown in table 1 as follows:

TABLE 1

| 0.2 C discharging capacity | 1 C discharging capacity | 5 C discharging capacity | 10 C discharging capacity | 20 C discharging capacity | AC internal resistance |
|---|---|---|---|---|---|
| 2200 mAh | 2168 mAh | 1995 mAh | 1876 mAh | 1786 mAh | 3.8 mΩ |

Preferably, the cell construct for facilitating the Nickel cathode 20 of the Ni—Zn of the present invention comprises a plate of nickel foam adapted for being filled by active substances through a dry or wet process. The Nickel cathode has an uncovered part at one edge which defines a current collector belt, shortening distance for electronic movement and reducing electric resistance, for providing excellent performance and thereby meeting requirements of large current discharging.

Preferably, the cell construct further provide a nickel foil welded at one side of the cathode defining a conductive anti-shake joint so as to enhance an anti-shake performance of the battery.

In other words, the nickel-zinc battery of the present invention comprises a cell body 10 defining a cell cavity 11, a nickel cathode 20 comprising a plate of nickel foam 22 filled with a plurality of active materials, a zinc anode 30, a membrane 50, and an electrolyte 40 communicated between the cathode 20 and the anode 30. The active materials include a first additive consisting of transition metal oxide, a second additive consisting of metal oxide or hydroxide with a rare earth oxide and/or zinc oxide or hydroxide. Preferably, the nickel cathode 20 has an uncovered part at one edge which defines a current collector belt 23 for providing excellent performance and thereby meeting requirements of large current discharging and a nickel foil 21 welded at one side of the cathode 20 defining a conductive anti-shake joint so as to enhance an anti-shake performance of the battery.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of manufacturing a nickel electrode for a nickel-zinc battery, comprising the steps of:
   (a) providing a nickel oxyhydroxide (NiOOH) and a nickel metal;
   (b) adding a first additive consisting of transition metal oxide to said nickel oxyhydroxide and said nickel metal; and
   (c) adding a binder for combining said first additive to said nickel oxyhydroxide and said nickel metal, wherein said first additive contains one or more transition metal oxides selected from a group consisting of ruthenium oxide ($RuO_2$) and rhodium oxide ($RhO_2$);
   wherein the step (b) further comprises the step of:
   (b.1) adding a second additive consisting of (i) a metal oxide with one or more rare earth oxides or (ii) a metal hydroxide with one or more rare earth oxides to said nickel oxyhydroxide and said nickel metal to increase an electrode capacity and a shelf life of said nickel electrode, wherein said binder combines said first additive and said second additive to said nickel oxyhydroxide and said nickel metal; and
   (b.2) adding a zinc oxide (ZnO) or hydroxide ($Zn(OH)_2$) so as to facilitate charge transfer and increase high-rate discharging ability, wherein said binder combines said first additive, said second additive and said zinc oxide or hydroxide to said nickel oxyhydroxide and said nickel metal.

2. A method of manufacturing a nickel electrode for a nickel-zinc battery, comprising the steps of:
   (a) providing a nickel oxyhydroxide (NiOOH) and a nickel metal;
   (b) adding a first additive consisting of transition metal oxide to said nickel oxyhydroxide and said nickel metal; and (c) adding a binder for combining said first additive to said nickel oxyhydroxide and said nickel metal, wherein said first additive contains one or more transition metal oxides selected from a group consisting of ruthenium oxide ($RuO_2$) and rhodium oxide ($RhO_2$);

wherein the step (b) further comprises a step of (b.1) adding a second additive consisting of (i) a metal oxide with one or more rare earth oxides or (ii) a metal hydroxide with one or more rare earth oxides to said nickel oxyhydroxide and said nickel metal to increase an electrode capacity and a shelf life of said nickel electrode, wherein said binder combines said first additive and said second additive to said nickel oxyhydroxide and said nickel metal;

wherein said nickel oxyhydroxide has a concentration from approximately 50% to 98% by weight, said nickel metal in powder form has a concentration from approximately 1% to 20% by weight, said first additive has a concentration from approximately 0.05% to 5% by weight, said second additive has a concentration from approximately 0.05% to 5% by weight and said binder has a concentration from approximately 0.05% to 5% by weight of solid content.

3. The method, as recited in claim 2, wherein said metal oxide or hydroxide is selected from a group consisting of MgO, $Mg(OH)_2$, $ZrO_2$, $Zr(OH)_4$, CaO, $Ca(OH)_2$, SrO and $Sr(OH)_2$ and said rare earth oxide is selected from the group consisting of $Y_2O_3$, $Yb_2O_3$ and $Lu_2O_3$.

4. The method, as recited in claim 1, wherein said nickel oxyhydroxide has a concentration from approximately 50% to 98% by weight, said nickel metal in powder form has a concentration from approximately 1% to 20% by weight, said first additive has a concentration from approximately 0.05% to 5% by weight, said second additive has a concentration from approximately 0.05% to 5% by weight, said zinc oxide or hydroxide has a concentration from approximately 0.1% to 5% by weight and said binder has a concentration from approximately 0.05% to 5% by weight of solid content.

5. The method, as recited in claim 4, wherein said metal oxide or hydroxide is selected from a group consisting of MgO, $Mg(OH)_2$, $ZrO_2$, $Zr(OH)_4$, CaO, $Ca(OH)_2$, SrO and $Sr(OH)_2$ and said rare earth oxide is selected from the group consisting of $Y_2O_3$, $Yb_2O_3$ and $Lu_2O_3$.

* * * * *